United States Patent [19]
Makineni et al.

[11] Patent Number: 5,996,065
[45] Date of Patent: *Nov. 30, 1999

[54] APPARATUS FOR BYPASSING INTERMEDIATE RESULTS FROM A PIPELINED FLOATING POINT UNIT TO MULTIPLE SUCCESSIVE INSTRUCTIONS

[75] Inventors: Sivakumar Makineni, Sunnyvale; Brian L. Hughes, Fremont; Sunhyuk Kimn, Campbell; Michael Chow, Cupertino; Suri Babu Medapati, Santa Clara; Albert Lo, Mountain View, all of Calif.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/831,473

[22] Filed: Mar. 31, 1997

[51] Int. Cl.⁶ .......................................................... G06F 9/38
[52] U.S. Cl. ................................................................ 712/218
[58] Field of Search .................................... 395/394, 395; 712/218, 219

[56] References Cited

U.S. PATENT DOCUMENTS

| 5,043,868 | 8/1991 | Kitamura et al. | 395/394 |
| 5,123,108 | 6/1992 | Olson et al. | 712/218 |
| 5,204,829 | 4/1993 | Lyu et al. | 364/748.14 |
| 5,467,476 | 11/1995 | Kawasaki | 712/218 |
| 5,619,664 | 4/1997 | Glew | 395/394 |
| 5,619,668 | 4/1997 | Zaidi | 712/200 |
| 5,638,526 | 6/1997 | Nakada | 395/394 |
| 5,805,852 | 9/1998 | Nakanishi | 712/218 |

*Primary Examiner*—Richard L. Ellis
*Attorney, Agent, or Firm*—Blakely, Sokoloff, Taylor & Zafman LLP

[57] ABSTRACT

A microprocessor having a pipelined floating point unit operable to bypass pre-rounded results at clock cycle i and provide the pre-rounded results as an operand for a second instruction at clock cycle i+2. In one embodiment, the pipelined execution unit includes at least a first execution step at clock cycle i, and a second execution step at a clock cycle i+1 and clock cycle i+2. The unit includes a bypass leading from the first execution step at clock cycle i, however, there is no bypass leading from the second execution step at clock cycle i+1. The bypass carries the pre-rounded results from the end of the first execution step to the front end of the pipeline via a latched data path which delays the pre-rounded result one clock cycle.

14 Claims, 3 Drawing Sheets

APPARATUS FOR BYPASSING INTERMEDIATE RESULTS FROM A PIPELINED FLOATING POINT UNIT TO MULTIPLE SUCCESSIVE INSTRUCTIONS

FIELD OF THE INVENTION

The present invention relates to computer systems, and in particular, relates to a microprocessor configured to eliminate pipeline bubbles in a bypassing scheme of a floating point instruction stream.

BACKGROUND OF THE INVENTION

Floating point within a microprocessor operations typically include multiple steps. In a first step, the arithmetic operation is performed to an infinite precision. In a second step, the result computed in the first step is normalized. In a third step, the result of the second step is rounded according to a rounding mode specified by the instruction. In particular, step three involves conditionally incrementing the mantissa of the result by a Unit in Last Place (ULP). Step three may also include checking for exceptions and responding to exceptions accordingly.

Typically, the latency of a floating point pipeline is reduced by hiding the third step. For example, assume in an instruction stream, instruction "n" is followed by instruction "n+1" which wants to use the results of instruction "n" as an operand.

The results of instruction "n" may get incremented (i.e., rounded) by a ULP in the third step of its execution. In other words, the result mantissa, generated by the second step and the result mantissa generated by the third step will typically only differ by a ULP. As a result, the latency of the floating point pipeline can be reduced by "bypassing" the results of instruction n following the second step as is illustrated in the flow diagram of FIG. 1.

More specifically, the intermediate results of instruction "n" may be bypassed from the end of step two to the front end of the floating point pipeline and made available as an operand for a dependent instruction (e.g., "n+1.") Assuming the results of instruction "n" were to have been rounded up during the third step, the rounding operation may be performed on the bypassed results in the first step of execution instruction n+1 in the floating point unit. In addition, the results from step three may also be bypassed to the front end of one floating point pipeline.

As previously stated, step three of the floating point operations may also involve detecting exceptions and manipulating the results in the case of exceptions. As a result, step three may require more than one microprocessor clock cycle in today's high frequency microprocessors.

For example, referring to FIG. 2, a floating point pipeline unit is shown wherein step three takes two clock (clk) cycles namely "i+2" (step 3a) and "i+3" (step 3b). If an intermediate result is unable to be bypassed from step 3a at the clock cycle i+2, there will be a "pipeline bubble" in the bypassing scheme. That is, there may be a bypass from the end of step two at clock cycle i+1 and a bypass from the end of step 3b at clock cycle i+3, no bypass would be available from step 3a at clock cycle +2. As a result, a pipeline bubble exist at the end of step 3a because the results of step 3a cannot be bypassed to the front of the floating point unit.

One solution is to provide a third bypassing path in the pipeline from step 3a at the clock cycle i+2 (i.e., the rounding stage). However, this solution necessitates additional silicon investments.

A second solution is to have the compiler compensate for the pipeline bubble in the bypassing scheme. However, the second approach results in compiler complexity and loss in performance due to unavailable bypassing paths.

As such, it can be appreciated that there is a need for a more efficient mechanism for eliminating pipeline bubbles in the bypassing scheme of a floating point pipeline.

SUMMARY OF THE INVENTION

The present invention provides a microprocessor having a pipelined execution unit. The pipelined execution unit includes a bypass operable to bypass intermediate results and provide the intermediate result as an operand for multiple sequentially executed instructions.

BRIEF DESCRIPTION OF THE DRAWINGS

The present invention is illustrated by way of example and not limitation in the figures of the accompanying drawings, and in which.

More specifically, in one embodiment of the present invention, the pipeline bubble is removed from the bypassing scheme of the floating point unit by latching bypassed results, prior to feeding the bypassed results to the front end of the pipeline.

Figure 1:
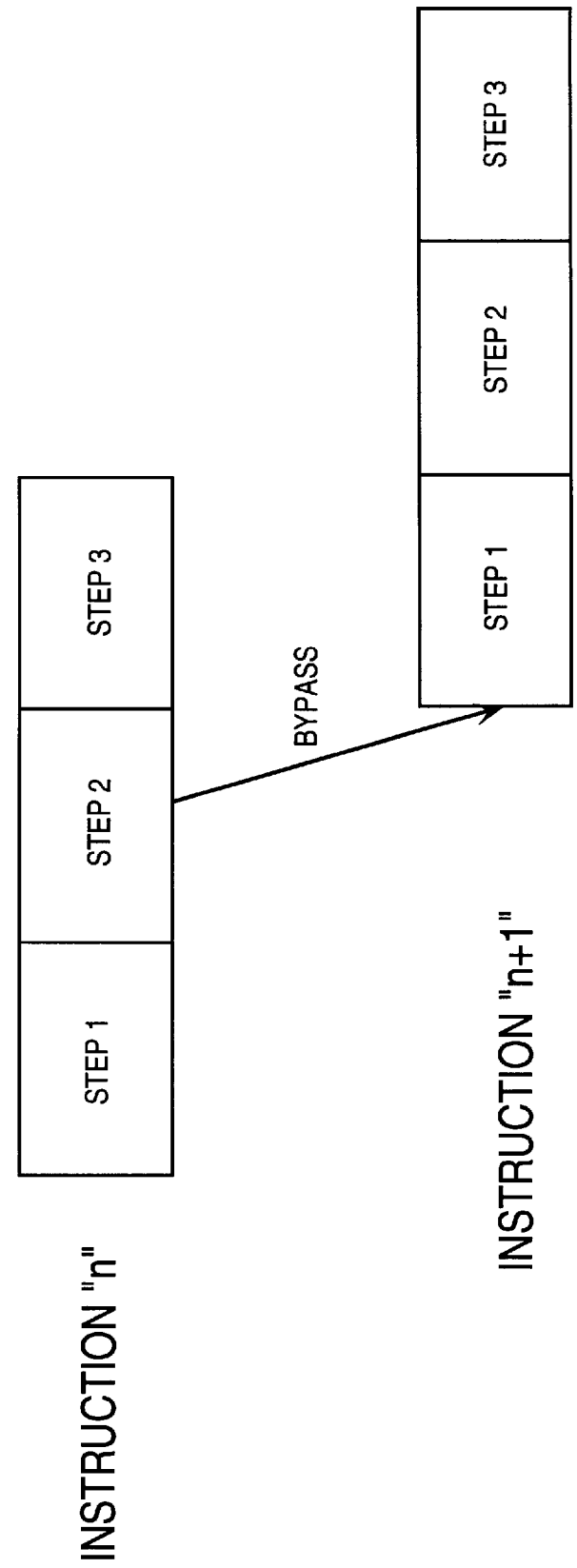
FIG. 1 illustrates a flow diagram of a floating point pre-round bypassing scheme.
Figure 2:
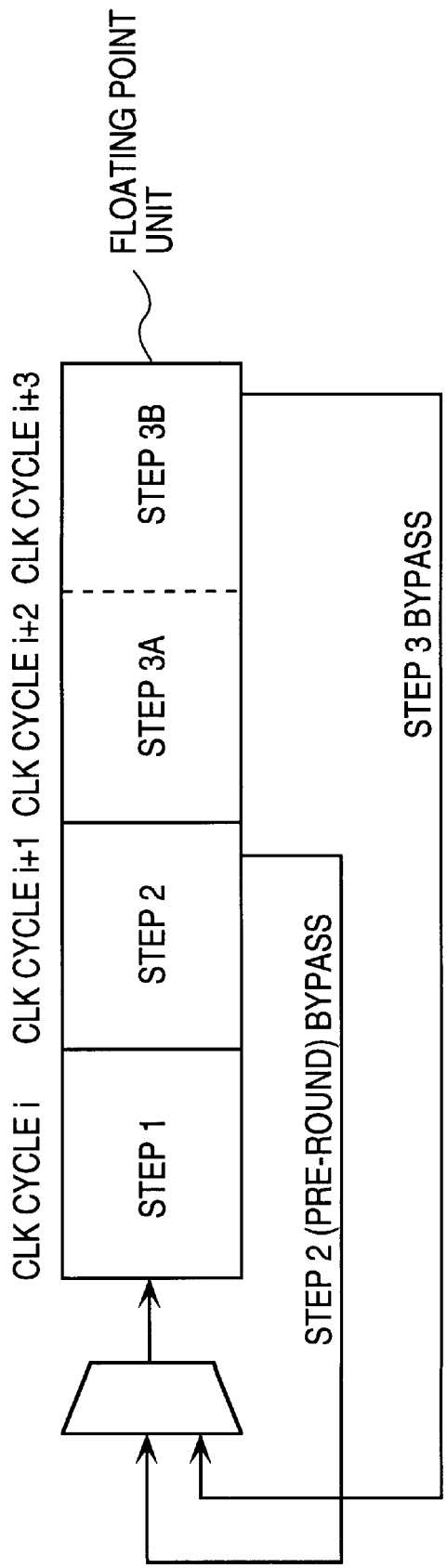
FIG. 2 illustrates a pipelined floating point unit having a pipeline bubble in the bypassing scheme.
Figure 3:
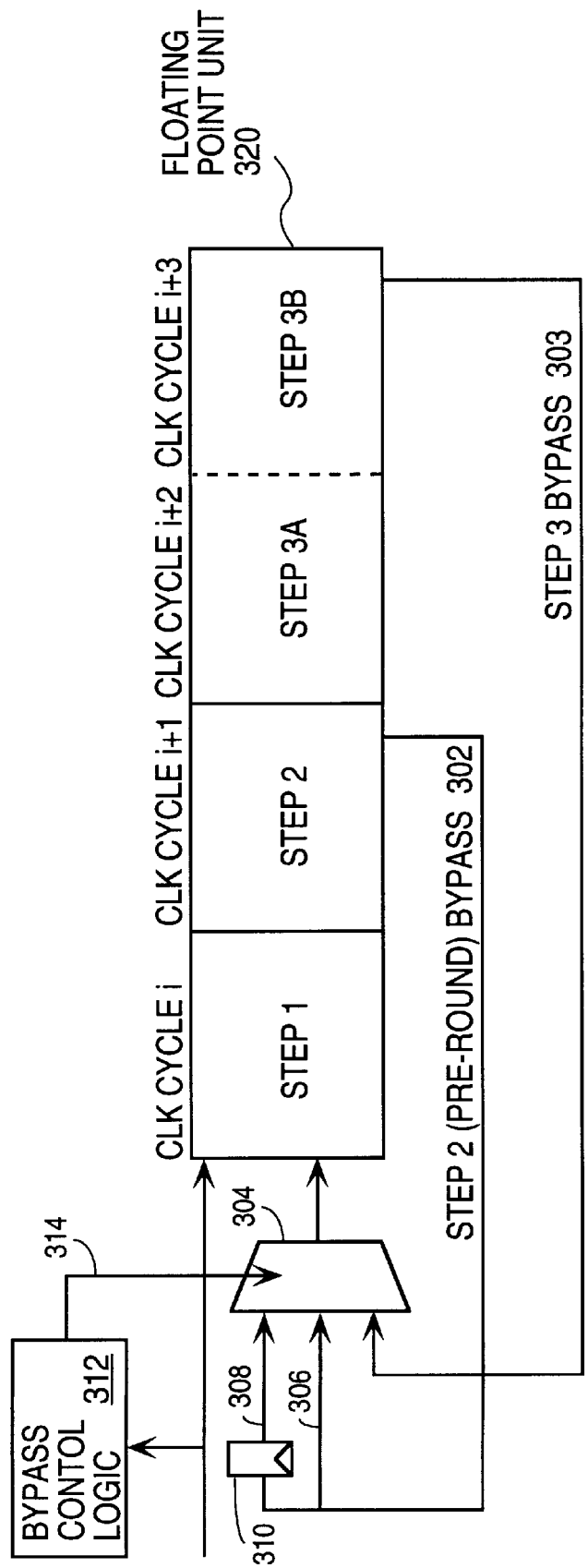
FIG. 3 illustrates a pipelined floating point unit configured to eliminate a pipeline bubble in the bypassing scheme, in accordance with one embodiment of the present invention.

FIG. 3 illustrates one embodiment of the present invention as implemented in a pipelined floating point unit 320 of a microprocessor. As shown in FIG. 3, a pre-round bypass 302 is provided at the end of step two. The pre-round bypass 302 will carry a copy of the bypassed results to a bypass mux 304 via a first data path 306 and a latched data path 308. The bypass mux 304 controls whether data from the first data path 306 or data from the latched data path are passed to the front end of the pipeline 320.

The bypassed results from the first data path 306 are provided to the "front end" of the pipeline at clock cycle i+2 (assuming step one of the pipeline begins at clock cycle i). Bypassed results from the latched data path 308, however, are provided to the front end of the pipeline at clock cycle i+3. The latched data path 308 is able to delay the bypassed results at least one clock cycle by placing a flip-flop circuit 310 along the latched data path 308.

In alternative embodiments, alternative latching devices may be used without departing from the scope of the invention. Moreover, the number of clock cycles that the bypassed results are delayed can vary by adding additional delay circuits along the latched data path 308 prior to the bypass mux 304.

As a result of latching the bypassed results, there is no need to provide additional bypass wires at the end of the intermediary stage (step 3a) of the third step at clock cycle i+2. The data may instead be bypassed as pre-rounded results from the end of the second step and delayed a clock cycle as if it had actually been bypassed from the intermediary stage of the third step at clock cycle i+2.

In one embodiment, the rounding operation, which is typically performed during the intermediary stage of the third step, may be replicated at the front end of the pipeline in step one, as is typically performed in conventional pre-round bypassing. For example, along with the result data, a feedback signal may also be bypassed to the front end of the pipeline. The feedback signal may indicate to a correction mechanism at the front end of the pipeline whether the bypassed result data is to be rounded up, as is typically performed in conventional pre-round bypassing.

In addition, in one embodiment, a bypass control logic 312 determines whether the bypass mux 304 passes data from the first data path 306, the latched data path 308, or data from the step 3 bypass 303. Conversely, the bypass control logic 312 may determine none of the bypassed data is needed, in which case the bypassed data is disregarded.

More specifically, in one embodiment, the bypass control logic 312 is placed at the front end of the floating point pipeline 320. The bypass control logic 312 receives a copy of each instruction that is issued to the floating point unit 320. The copies of the instructions may be latched inside the bypass control logic for a length of time equal to the length of the pipeline (e.g., i+3).

In addition, before each new instruction is issued to the front end of the pipeline, the bypass control logic will compare the source register identifier (Id) contained in the new instruction with the destination register Id of each instruction presently being latched by the bypass control logic. A match between the register identifiers indicates the new instruction is dependent on the results of an instruction presently being executed by the pipeline.

Furthermore, based on the length of time that the matching instruction has been latched, the bypass control logic will send a select signal 314 to the bypass mux 304. The select signal identifies which bypass result is to be passed through the bypass mux 304.

For example, if the matching instruction has been latched in the bypass control logic for i+2 clock cycles, then the select signal indicates the bypassed results from the latched data path 308 are to pass through the bypass mux. Alternatively, if the matching instruction has only been latched in the bypass control logic for i+1 clock cycles, then the select signal indicates the bypassed results from the first data path 306 are to pass through the bypass mux.

Alternatively, the latching of bypassed data could be implemented in other bypassed paths connected to alternative steps within the pipeline. In addition, the present invention could be implemented in other pipelined execution units of a microprocessor. Moreover, the number of steps or pipeline stages within the execution unit can vary within the scope of the invention. As well, the number of clock cycles per step can vary within the scope of the invention.

Furthermore, in the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A microprocessor comprising of:
   a first pipelined unit; and
   a first bypass coupled to said first pipelined execution unit, said first bypass to bypass a first intermediate result to provide said first intermediate result as an operand for multiple successive instructions, said first bypass coupled to latched data path.

2. The microprocessor of claim 1, wherein said pipelined execution unit includes at least a first execution step and a second execution step, wherein said first execution step requires one clock cycle and said second execution step requires at least two clock cycles;
   said first bypass is coupled to a back end of said first execution step; and
   said second execution step is exclusive of a bypass prior to a back end of said second step.

3. The microprocessor of claim 2, wherein said second execution step includes one exclusive bypass coupled to a back end of said second execution step.

4. The microprocessor of claim 2, wherein said latched data path is operable to delay said first intermediary result at least one clock cycle.

5. The microprocessor of claim 4, wherein said first bypass is further coupled to a first data path, said first data path is coupled to a front end of said first step of said pipelined execution unit, said first data path is operable carry said first intermediary result without a delay.

6. The microprocessor of claim 4, wherein said pipelined unit is a floating point unit, and said intermediary result is a pre-rounded result.

7. A microprocessor comprising of:
   a pipelined execution unit having a first bypass to bypass a first intermediate result of a first instruction at a clock cycle i and provide said first intermediate result as an operand for a second instruction at one of a clock cycle at i+1 and a clock cycle i+2, said first bypass coupled to a latched data path.

8. The microprocessor of claim 7, wherein said pipelined execution unit includes at least a first execution step at clock cycle i, and a second execution step at a clock cycle i+1 and clock cycle i+2, said pipeline execution unit further includes a first bypass coupled to a back end of said first execution step, and said second execution step is exclusive of an intermediary bypass at clock cycle i+1.

9. The microprocessor of claim 8, wherein said second execution step includes one exclusive bypass coupled to a back end of said second execution step.

10. The microprocessor of claim 8, wherein said latched data path is operable to delay said first intermediary result at least one clock cycle.

11. The microprocessor of claim 10, wherein said first bypass is further coupled to a first data path, said first data path is coupled to a front end of said first step of said pipeline execution unit, said first data path is operable carry said first intermediary result without a delay.

12. The microprocessor of claim 11, wherein said pipeline execution unit is a floating point unit, and said intermediary result is a pre-rounded result.

13. A microprocessor comprising of:
   a first pipelined execution unit having at least a first and second execution step, said second execution step consisting of multiple clock cycles to complete said second execution step, said second execution step exclusive of a bypass prior to an end of said second execution step, and said first pipeline further having a first bypass to bypass results from an end of said first step and provide said results to as an operand for a dependent instruction at one of a clock cycle corresponding to a partial completion of said second execution step and a clock cycle corresponding to a full completion of said second execution step, said first bypass coupled to a latched data path.

14. The microprocessor of claim 13, wherein said first bypass is configured to bypass intermediate results from an end of said first execution at dock cycle i, said bypass having a first data path wherein said intermediate results are passed to a front end of said pipelined unit at clock cycle i+1, wherein said intermediate results are passed to said front end of said pipelined unit at clock cycle i+2.

* * * * *